US009083403B2

(12) United States Patent
Lin et al.

(10) Patent No.: US 9,083,403 B2
(45) Date of Patent: Jul. 14, 2015

(54) MULTIPLE INPUT, MULTIPLE OUTPUT WIRELESS COMMUNICATION SYSTEM, ASSOCIATED METHODS AND DATA STRUCTURES

(71) Applicant: Intel Corporation, Santa Clara, CA (US)

(72) Inventors: Xintian E. Lin, Mountain View, CA (US); Qinghua Li, San Ramon, CA (US); Keith A. Holt, El Dorado Hills, CA (US); Raymond C. Blackham, Penn Valley, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/594,325

(22) Filed: Jan. 12, 2015

(65) Prior Publication Data

US 2015/0124898 A1    May 7, 2015

Related U.S. Application Data

(63) Continuation of application No. 14/160,870, filed on Jan. 22, 2014, now Pat. No. 8,934,567, which is a continuation of application No. 13/292,528, filed on Nov. 9, 2011, now Pat. No. 8,665,981, which is a
(Continued)

(51) Int. Cl.
*H04B 7/02* (2006.01)
*H04B 7/04* (2006.01)

(52) U.S. Cl.
CPC .................................. *H04B 7/0478* (2013.01)

(58) Field of Classification Search
CPC .. H04B 7/0417; H04B 7/0456; H04B 7/0478; H04B 7/0482; H04B 7/0639; H04B 7/0643; H04B 7/0645; H04L 1/0026; H04L 1/0029; H04L 1/0009; H04L 1/003; H04L 1/0031
USPC ......... 375/260, 262, 265, 267, 340, 346, 349; 455/67.11, 68–69
See application file for complete search history.

(56) References Cited

U.S. PATENT DOCUMENTS

| 5,263,033 | A | 11/1993 | Seshadri | |
|---|---|---|---|---|
| 5,608,397 | A | 3/1997 | Soljanin | |
| 6,372,583 | B1 | 4/2002 | Tyagi | |
| 6,417,550 | B1 | 7/2002 | Madurawe et al. | |
| 7,310,598 | B1 * | 12/2007 | Mikhael et al. | ............... 704/230 |

(Continued)

FOREIGN PATENT DOCUMENTS

WO        2007/067666 A1    6/2007

OTHER PUBLICATIONS

Extended Search Report received for European Patent Application No. 14169148.5, mailed on Aug. 29, 2014, 9 pages.
(Continued)

*Primary Examiner* — Khanh C Tran
(74) *Attorney, Agent, or Firm* — Alpine Technology Law Group LLC

(57) ABSTRACT

Briefly, in accordance with one or more embodiments, a wireless signal is transmitted to a remote device. The remote device determines a precoding matrix indicator (PMI) in response to the wireless signal based at least in part on a hierarchical codebook. The PMI is then received as reported back from the remote device.

20 Claims, 5 Drawing Sheets

Related U.S. Application Data continuation of application No. 12/715,317, filed on Mar. 1, 2010, now Pat. No. 8,068,554, which is a continuation of application No. 11/313,532, filed on Dec. 20, 2005, now Pat. No. 7,672,387, which is a continuation-in-part of application No. 11/294,823, filed on Dec. 5, 2005, now abandoned.

(56) References Cited

U.S. PATENT DOCUMENTS

| | | | |
|---|---|---|---|
| 7,336,727 | B2 | 2/2008 | Mukkavilli et al. |
| 7,629,902 | B2 | 12/2009 | Zhang et al. |
| 7,649,831 | B2 | 1/2010 | Van Rensburg et al. |
| 7,672,387 | B2 | 3/2010 | Lin et al. |
| 8,068,554 | B2 | 11/2011 | Lin et al. |
| 8,189,714 | B2 | 5/2012 | Tong et al. |
| 8,442,140 | B2 * | 5/2013 | Zhou et al. ............ 375/267 |
| 8,665,981 | B2 | 3/2014 | Lin et al. |
| 2004/0072395 | A1 | 4/2004 | Liu |
| 2006/0056531 | A1 | 3/2006 | Li et al. |
| 2008/0037675 | A1 | 2/2008 | Lin et al. |
| 2008/0207135 | A1 * | 8/2008 | Varadarajan et al. ........ 455/69 |
| 2008/0304463 | A1 * | 12/2008 | Borkar et al. ............ 370/342 |
| 2009/0046569 | A1 * | 2/2009 | Chen et al. ............. 370/203 |
| 2009/0274230 | A1 * | 11/2009 | Heath et al. ............ 375/260 |
| 2010/0260243 | A1 | 10/2010 | Ihm et al. |
| 2013/0028340 | A1 | 1/2013 | Yang et al. |
| 2013/0223547 | A1 * | 8/2013 | Zhou et al. ............ 375/260 |

OTHER PUBLICATIONS

Love et al., "Multimode Precoding for MIMO Wireless Systems", IEEE Transactions on Signal Processing, vol. 53, Oct. 10, 2005, pp. 3674-3687.

Zhang et al., "A Tracking Approach for Precoded MiMO-OFDM Systems with Low Data Rate CSI Feedback", 2005 IEEE 16th International Symposium on Personal Indoor and Mobile Radio Communications, Jan. 1, 2005 pp. 241-245.

Office Action received for European Patent Application No. 06839129.1, mailed on Mar. 31, 2011, 5 pages.

European Search Report received for European Patent Application No. 12155059.4, mailed on Mar. 12, 2012, 8 pages.

Office Action received for European Patent Application No. 12155059.4, mailed on May 29, 2012, 2 pages.

Office Action received for Chinese Patent Application No. 200680041300.8, mailed on Mar. 3, 2011, 10 pages. including 6 pages of English Translation.

Office Action received for Chinese Patent Application No. 200680041300.8, mailed on Dec. 3, 2012, 8 pages, including 5 pages of English Translation.

Office Action received for Chinese Patent Application No. 200680041300.8, mailed on Jul. 2, 2012, 8 pages, including 4 pages of English Translation.

Mondal et al., "Adaptive Feedback for MIMO Beamforming Systems", Signal Processing Advances in Wireless Communications, 2004 IEEE 5th Workshop on Lisbon, Portugal, Piscataway, NJ, USA, IEEE, Jul. 11, 2004, pp. 213-217.

Roh et al., "Channel Feedback Quantization Methods for MISO and MIMO Systems" Personal, Indoor and Mobile Radio Communications, 2004. PIMRC 2004, 15th IEEE International Sumposium in Barcelona, Spain, Piscataway, NJ, USA, IEEE, Sep. 5, 2004, 5 pages.

International Preliminary Report on Patentability and Written Opinion Received for PCT Patent Application No. PCT/US2006/046628, mailed on Jun. 11, 2008, 7 pages.

International Search Report and Written Opinion received for PCT Patent Application No. PCT/US2006/046628, mailed on Apr. 19, 2007, 11 pages.

Office Action received for European Patent Application No. 14169148.5, mailed on Oct. 27, 2014, 2 pages.

* cited by examiner

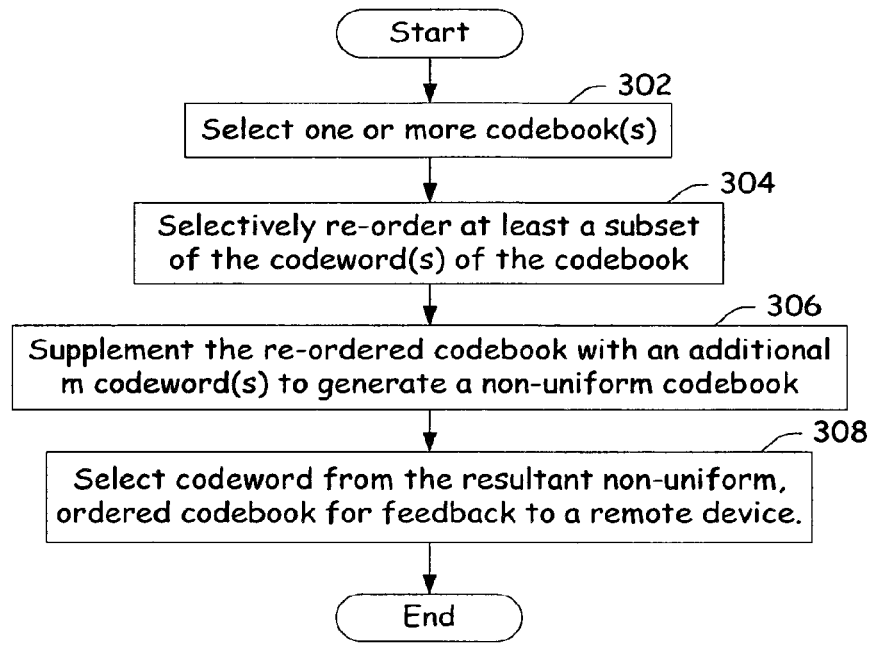
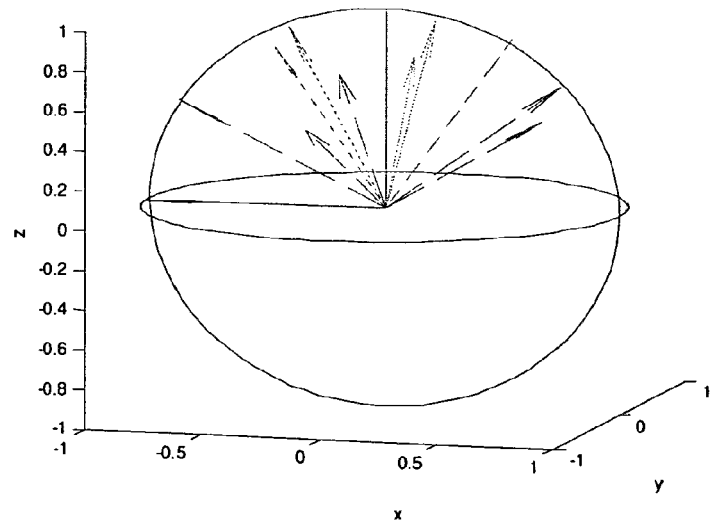

MULTIPLE INPUT, MULTIPLE OUTPUT WIRELESS COMMUNICATION SYSTEM, ASSOCIATED METHODS AND DATA STRUCTURES

CROSS-REFERENCE TO RELATED APPLICATIONS

This application is a continuation of U.S. application Ser. No. 14/160,870 filed Jan. 22, 2014, pending, which is a continuation of U.S application Ser. No. 13/292,528 filed Nov. 9, 2011, now U.S. Pat. No. 8,665,981, which is a continuation of U.S. application Ser. No. 12/715,317 filed Mar. 1, 2010, now U.S. Pat. No. 8,068,554, which is a continuation of U.S. application Ser. No. 11/313,532 filed Dec. 20, 2005, now U.S. Pat. No. 7,672,387, which is a continuation-in-part of U.S. application Ser. No. 11/294,823 filed Dec. 5, 2005, now abandoned. Said application Ser. Nos. 14/160,870, 13/292,528, 12/715,317, 11/313,532, and 11/294,823 are hereby incorporated herein by reference thereto in their entireties.

TECHNICAL FIELD

Embodiments of the invention are generally directed to communication systems and, more particularly, to multiple input, multiple output (MIMO) wireless communication system, associated methods and data structures.

BACKGROUND

The use of multiple signaling paths, e.g., through the use of multiple input multiple output (MIMO) technology can significantly increase the effective range of a wireless communication channel. Despite the significant advantages gained from the introduction of MIMO technology into a communications device, implementation problems persist which have limited the widespread adoption of such technologies.

Accordingly, practical MIMO implementations that enable the widespread adoption of such technologies have yet to be realized. A number of example MIMO implementations, methods and associated data structures are provided in the disclosure below that address one or more of these conventional limitations.

BRIEF DESCRIPTION OF THE DRAWINGS

Embodiments of the present invention are illustrated by way of example, and not by way of limitation, in the figures of the accompanying drawings in which like reference numerals refer to similar elements and in which:

FIG. 3 is a flow chart of an example method for beamforming using a non- uniform codebook, according to one embodiment;

FIG. 4 is a graphical illustration of a uniform codebook;

DETAILED DESCRIPTION

Figure 1:
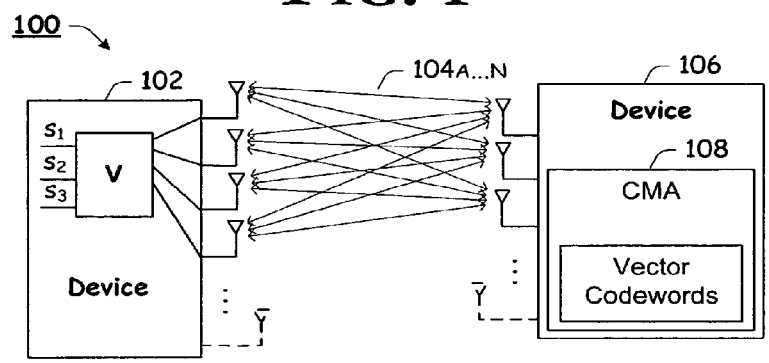
FIG. 1 is a block diagram of an example communication system within which embodiments of the invention may be practiced.

Embodiments of a wireless communication system, associated methods and data structures are generally presented which implement one or more example MIMO embodiments.

In co-pending U.S. patent application Ser. No. 11/036,906 entitled Codebook Generation System and Associated Methods filed Jan. 13, 2005, by Lin, et al. (hereinafter, the Lin application), the disclosure of which is incorporated herein by reference for all purposes, a codebook generation agent (CGA) was introduced dynamically generated one or more matrix codebook(s) from, e.g., matrix codewords that are dynamically generated from, e.g., vector codebook(s) for 2-, 3-, 4-, . . . , N-unit vectors. Those skilled in the art will appreciate that such N-Dimension unit vectors are already disposed on such communication device(s) to support a number of other features such as, e.g., single data stream beamforming. As such, the co-pending Lin application represents a significant improvement in MIMO implementations.

With this application, the Lin reference is extended to introduce an innovative code management agent (CMA) According to one embodiment, described more fully below, a codebook management agent (CMA), which may be selectively invoked to dynamically generate and/or utilize one or more of uniform, non-uniform and/or a hierarchical codebook(s) in support of, e.g., a closed loop MIMO (or, beamforming) implementation. The CMA disclosed herein may well include and/or be coupled to one or more CGA's, although the scope of the invention is not so limited.

Beamforming is a useful technique to increase the effective signal to noise ratio (SNR) perceived by receivers within MIMO systems. In an explicit feedback scheme, information associated with a beamforming matrix is sent back to the transmitter. To efficiently encode the beamforming matrix, a series of vector codebook(s) may be designed and/or dynamically generated, e.g., as provided for in the above referenced co-pending application. In uncorrelated channels, the beamforming matrix is uniformly distributed in the Stiefel manifold (see, e.g., FIG. 4). In this regard, in traditional implementations a vector codebook is substantially optimized to cover the whole manifold with the following criteria:

$$C(m, N) = \mathop{\mathrm{argmax}}_{c_i}(\min(d_c(c_i, c_j), i < j = 1, \ldots, N), c_i \in C_m \text{ with} \|c_i\| = 1) \quad (1)$$

where m is the dimension of the vector codebook and N is the number of codewords populating the codebook. The complex m-tuple space is denoted $C_m$. The chordal distance is defined as:

$$d_c(c_i, c_j) = \sqrt{1 - \|c_i^H c_j\|2} \quad (2)$$

where normal inner product is used.

When the beamforming vector $v_m$ is quantized, the codeword with the smallest chordal distance is selected:

$$\hat{v}_m = \underset{c_i}{\operatorname{argmin}}(d_c(c_i, v_m), c_i \in C(m, N)) \quad (3)$$

This class of "uniform" codebook may well be designed and implemented using one or more of the techniques disclosed in the above referenced co-pending application. The codebooks described therein represent an improvement on the order of a factor of 2-4 in quantization efficiency with the same or better performance compared to other schemes.

In situations where consecutive data packets are sent, the time between packets is short. In slowly fading or static channels, the channel characteristics will generally not change substantially during this period of time. Consequently only a small beam steering correction is required to correct the subsequent drift. In the embodiments below, this property of static or slowly fading channels is leveraged in the design and utilization of new codebooks effectively reducing quantization complexity (and, as such computational complexity) while improving beamforming accuracy.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Technical detail regarding some of the operating characteristics of the mobile devices and/or the wireless communication network(s) in which the CMA may be implemented may be found in, e.g., the IEEE 802.11, 1999 Edition; Information Technology Telecommunications and Information Exchange Between Systems—Local and Metropolitan Area Networks—Specific Requirements, Part 11: WLAN Medium Access Control (MAC) and Physical (PHY) Layer Specifications, its progeny and supplements thereto (e.g., 802.11a, .11g and .11n). See, also, the IEEE Std 802.16-2001 IEEE Std. 802.16-2001 IEEE Standard for Local and Metropolitan area networks Part 16: Air Interface for Fixed Broadband Wireless Access Systems, its progeny and supplements thereto (e.g., 802.16a, .16d, and .16e).

1. Example Communications Environment

In FIG. 1, a block diagram of an example wireless communication environment 100 is depicted within which embodiments of the invention may well be practiced. In accordance with the illustrated example embodiment of FIG. 1, an example communications environment 100 is depicted comprising one wireless communications device 102 in communication with another wireless communications device 106 through a wireless communication link 104. As used herein, communication environment 100 is intended to represent any of a wide range of wireless communication networks including, but not limited to, a near-field communication (NFC) network, a wireless local area network (WLAN), a wireless metropolitan area network (WMAN), a wireless wide area network (WWAN), a cellular radiotelephony network, a personal communication system (PCS) network, and the like.

According to one embodiment, for purposes of illustration and not limitation, communication network 100 will be described in the context of an 802.11x (where x is a, b, g, n and/or combinations and/or progeny thereof), although the scope of the invention is not limited in this regard. In accordance with this illustrative example, device 102 may be an access point (AP), while device 106 may be a remote station (STA), although the scope of the invention is not limited in this regard.

In a closed-loop MIMO system a data signal is weighted by a beamforming matrix V, and then selectively transmitted by a plurality of antennas, as shown. According to one embodiment, the data signal may comprise a number of data streams ($N_1 \ldots N_s$), although the invention is not limited in this regard. The number of data streams may represent the number of spatial channels, with appropriate bit-loading, power weighting and subcarrier assignments, although the invention is not limited in this regard.

According to one embodiment with four (4) transmit antennae and three (3) data streams (for ease of illustration), the transmitted signal (x) transmitted via the $N_t$ (4) antennae may be represented as:

$$x = V \cdot s$$

where $$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \text{ and } s = \begin{bmatrix} s_3 \\ s_2 \\ s_3 \end{bmatrix} \quad (4)$$

As shown, s is an $N_s$-vector of data symbols, and V is the $N_t$ by $N_s$ beamforming matrix developed from information (e.g., matrix codebook(s) and or indices thereto) fed back from a remote receiver (e.g., 102). According to one embodiment, the beamforming matrix V is typically unitary, and power/bit loading may be applied on vector s, as introduced above, although the invention is not limited in this regard.

Device 106 is depicted comprising a codebook management agent (CMA) 108 to dynamically generate and or manage the utilization of one or more matrix codebook(s) from which channel state information may be characterized and fed back to a remote device, e.g., 102. According to one embodiment, described more fully in the co-pending application introduced above (and incorporated herein), rather than storing one or more matrix codebooks, CMA 108 may compile the matrix codebooks, or a portion thereof, necessary to characterize the channel state information from matrix codeword(s) dynamically generated from one or more vector codebook(s) for 2-, 3-, 4-, . . . , N-unit vectors.

2. Example Beamforming Implementation

Figure 2:
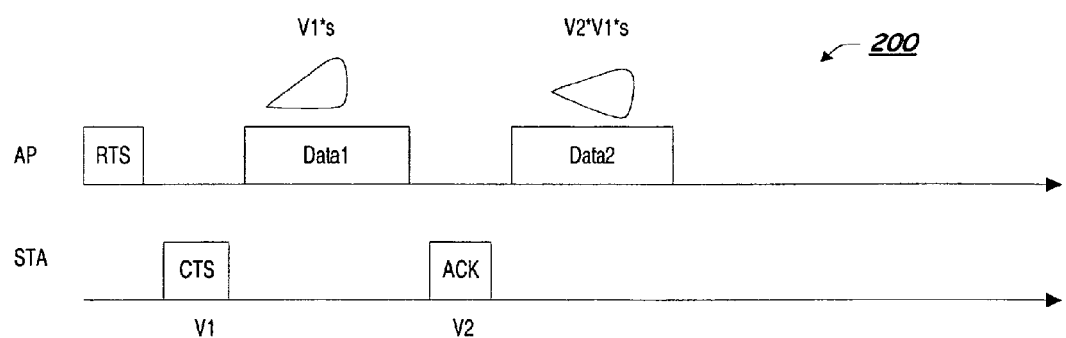
FIG. 2 provides a graphical representation of an example beamforming process, according to one embodiment.

Turning to FIG. 2, a graphical representation of an example beamforming process, according to one embodiment. With reference to FIG. 2, the example process begins with the access point (AP) (e.g., 106) issuing a request-to-send (CTS) (or, a sounding packet) message to a remote station along a communication channel (e.g., 104).

The remote station (STA) (e.g., 102) measures the channel and invokes an instance of the channel management agent (CMA) 108 to calculate a beam forming matrix, e.g., with singular value decomposition (SVD) as:

$$H_1 = U_1 \Sigma_1 V_1^H \quad (5)$$

where $V_1$ is $N_t$ by $N_r$; $U_1$ is $N_r$ by $N_r$; and $\Sigma_1$ is Nr by Nr.

The STA then feeds back the quantized beamforming matrix $\hat{V}_1$, which is $N_t$ by $N_r$, in a Clear To Send (CTS) packet or other feedback (or response) packet.

The AP multiplies the message s, which is $N_r$ by 1 with $N_s$ nonzero streams, by the beamforming matrix $\hat{V}_1$ as $\hat{V}_{1s1}$. The AP sends the beamformed Data1 packet, from which the STA measures the new equivalent channel $H_2 \hat{V}_1$.

The STA computes the new beamforming matrix $\tilde{V}_2$ as:

$$H_2 \hat{V}_1 = U_2 \Sigma_2 \underbrace{V_2^H \hat{V}_1}_{\tilde{V}_2^H} = U_2 \Sigma_2 \tilde{V}_2^H \quad (6)$$

If the channel change between $H_1$ and $H_2$ is small and the quantization error in $\hat{V}_1$ is small, $\tilde{V}_2$ is closer to identity matrix. The STA quantizes $\tilde{V}_2$ to $\hat{V}_2$ and feeds $\hat{V}_2$ back. Because $\hat{V}_2$ is $N_t$ by $N_t$, the AP can directly multiply the $N_t$ by 1 message vector with the $\hat{V}_2$ as $\hat{V}_2 \hat{V}_{1S2}$, and send the message to the STA. The STA computes the new beamforming matrix $V_3$ as:

$$H_3 \hat{V}_2 = U_3 \Sigma_3 \underbrace{V_3^H \hat{V}_2}_{\tilde{V}_3^H} = U_3 \Sigma_3 \tilde{V}_3^H \quad (7)$$

Since the STA may decide to receive signal from the strongest $N_s$ beamformed channels, it only feeds back $N_s$ columns of the computed $N_t$ by $N_t$ beamforming matrix, which correspond to the strongest $N_s$ channels. For this case, the sounding is not straightforward. The AP needs to expand the fed back Nt by Ns beamforming matrix to Nt by Nt so that the sounding of all Nt channels can be done. The expansion adds Nt-Ns columns so that the expanded matrix is a unitary matrix as:

$$\hat{V} = [b_1 \ldots b_{N_t}]_{N_t \times N_s} \rightarrow \nabla = [b_1 \ldots b_{N_s} b_{N_t+1} \ldots b_{N_t}]_{N_t \times N_t} \quad (8)$$

The expansion can be computed by Householder reflection as below or other methods.

$$\overline{V} = F_1 \begin{bmatrix} 1 & & & \\ & \ddots & & \\ & & F_{N_s-1} \begin{bmatrix} 1 & \\ & F_{N_s} \end{bmatrix} \end{bmatrix} \quad (9)$$

where $F_i = I - 2w_i w_i^H$ is the Householder reflection matrix of feedback Householder vector in the co-pending Lin application;

$$w_i = \frac{\hat{v}_i - e_1}{\|\hat{v}_i - e_1\|}$$

and $e_1 = [1, 0, \ldots, 0]^T$; $\hat{v}_i$ is computed from the feedback index $q_i$ in the co-pending Lin application. The only difference between equation (7) and the reconstruction step in the Lin application is that $F_{N_s}$ in (8) is replaced by $\hat{v}_{N_s}$ in the Lin application. For adaptive bit or power loading, the beamforming vectors may be sorted according to their corresponding singular values before quantization and index feedback.

It should be appreciated, however, that any unitary matrix G that transforms $[1\ 0 \ldots 0]^T$ into $\hat{v}_i$ (within a global phase) may well be substituted for the Housholder reflection described above. For example, the Householder reflection may well be replaced with a series of Given's rotations, e.g.

$$B_i = \Psi(N_i, \phi_{N_i} - \phi_{N_i} - 1) G(N_i - 1, N_i, \phi_{N_i-1}) \ldots \Psi(2, \phi_2 - \phi_1) G(1, 2, \theta_1) \quad (10)$$

where $$G(m, n, \theta) = \begin{bmatrix} I_{m-1} & & & & \\ & \cos\theta & & -\sin\theta & \\ & & I_{n-m-1} & & \\ & \sin\theta & & \cos\theta & \\ & & & & I_{N_i-n} \end{bmatrix}$$

is a Given's rotation between row m and n with angle $\theta$; $\Psi(m, \phi)$ is an identity matrix with the m'th diagonal element replaced by $e^{j\phi}$; and $N_i$ is the complex dimension of $v_i$. The angles $\theta$ and $\phi$ are Given's angle representation of unit norm vector. For example, a unit norm 4-vector may be represented by $$\begin{bmatrix} \cos\theta_1 e^{j\varphi_1} \\ \sin\theta_1 \cos\theta_2 e^{j\varphi_2} \\ \sin\theta_1 \sin\theta_2 \cos\theta_3 e^{j\varphi_3} \\ \sin\theta_1 \sin\theta_2 \sin\theta_3 e^{j\varphi_4} \end{bmatrix}$$

Similarly, the Household reflection may be replaced with a 180-degree rotation around the vector $[1\ 0 \ldots 0]^T + v_i$. In this regard, the coarse vector codebook may be stored in form of Givens angles $\theta_j$ and $\phi_k$.

It should be noticed that the Householder reflection matrix $F_i$ in the co-pending Lin application for quantization (not reconstruction) can be replaced by any unitary matrix $A_i$ that has $\hat{v}_i$ or $v_i$ as the first column, where $\hat{v}_i$ and $v_i$ are the quantized vector and the vector for quantization respectively. For one example, the matrix $A_i$ that converts $v_i$ to $[e^{j\phi} 0.0 \ldots 0.0]^T$ with quantization error can be $E_i$, where $E_i = B_i^H$ and $B_i$ can convert $[1\ 0 \ldots 0]^T$ to $e^{j\Psi} v_i$ with quantization error.

3. Example Codebook Data Structure(s)

Having introduced an example operational implementation, above, a number of improvements to the conventional uniform codebook will now be introduced. According to one embodiment developed more fully below, CMA 108 may be invoked to selectively re-order the elements of a uniform codebook, e.g., such as one generated above, to effectively reduce the computational complexity of the quantization process. According to one embodiment, the codewords of the codebook are arranged such that those codewords with the largest real-component on the first element appear earlier in the codebook than those codewords with smaller real-components. Accordingly, there is no need to search the full codebook. Feeding back the best of the first few codewords is good enough for convergence. This particular ordering of the codewords reduces the quantization complexity in the tracking mode.

Figure 5:
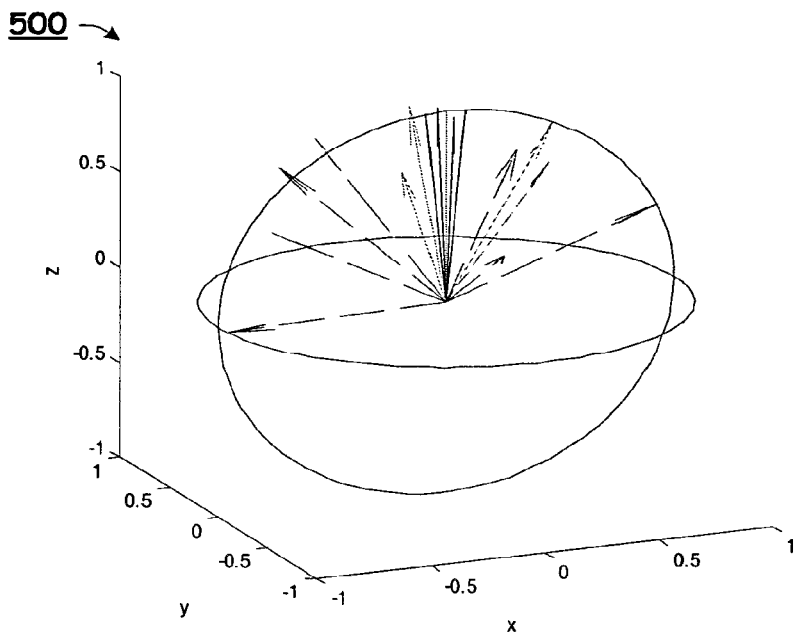
FIG. 5 is a graphical illustration of a non-uniform codebook, according to one embodiment.

According to another aspect of embodiments of the invention, CMA 108 may selectively add another m-elements to an otherwise uniform codebook to generate a non-uniform codebook, wherein m is two to thirty-two. That is, according to one embodiment, developed more fully below, CMA 108 selectively adds one to m-codewords to the codebook to generate a non-uniform codebook, e.g., when a stationary (or, slowly changing) channel is detected. According to one embodiment, the additional m codewords of the non-uniform codebook are tightly centered around the codeword $[1, 0, \ldots, 0]^T$, as depicted in FIG. 5. Alternatively, CMA 108 may dynamically select a pre-configured non-uniform codebook.

Figure 7:
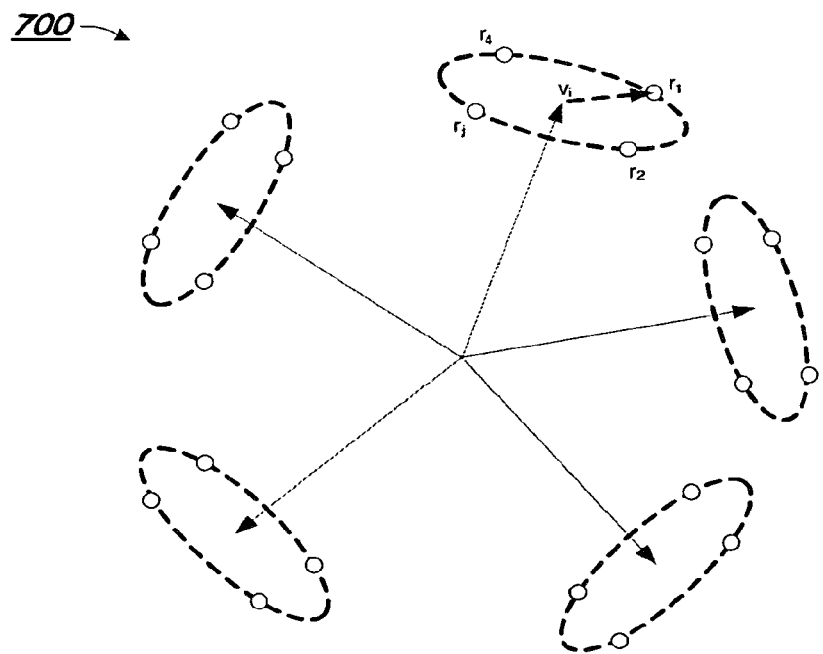
FIG. 7 is a graphical illustration of a hierarchical codebook, according to one embodiment.

According to another aspect of embodiments of the invention, CMA 108 may employ two sets of codebooks for quantization. The first set is for coarse quantization while the second is for fine quantization around a selected center. According to one embodiment, CMA 108 may concatenate the codebooks. The concatenation of one coarse codebook and one (or multiple) fine codebooks (with decreasing radiuses) effectively forms a hierarchy codebook as shown in FIG. 7.

While the concatenated codebook may not provide the optimal computational performance for a given feedback overhead, it enables low complexity quantization and scalable feedback resolution. In addition, since the beamforming matrix approaches the identity matrix after several feedback iterations, the station may only use fine codebooks without coarse codebooks for the quantization of some vectors in slow fading. This reduces the feedback overhead for tracking the beamforming matrix.

It will be appreciated that but for the introduction of the CMA 108, device 106 is intended to represent any of a wide variety of electronic device(s) with wireless communication capability. In some embodiments, CMA 108 may well be implemented within a receiver element of a device. In other embodiments, CMA 108 is responsive to a communicatively coupled receiver to perform the functions described herein. According to some embodiments, CMA 108 may well be implemented in hardware, software, firmware and/or any combination thereof.

4. Example CMA Operation

Turning to FIG. 3, a flow chart of an example method for utilizing the non-uniform codebook(s) introduced above is generally presented, according to one embodiment. The example method of FIG. 3 begins with block 302 wherein the code management agent (CMA) 108 selects one or more codebook(s). According to one embodiment, the codebook may be selected from a pre-populated plurality of codebooks, or dynamically generated in accordance with the teachings of the Lin application (incorporated herein).

In block 304, CMA 108 may selectively re-order the uniform codebook, introduced above. According to one embodiment, CMA 108 may arrange the codebook as follows: take any codeword $c_0$, perform a unitary rotation or reflection G, such that $G \cdot c_0 = [1, 0, \ldots, 0]^T$. An equivalent codebook may be formed by the global operation of G on every codeword of $C(m,N) C(m,N) = G \cdot C(m,N)$.

According to one embodiment, CMA 108 may order the codewords according to the magnitude of the first element $|c_i(1)|$. An example of C(2,12) is provided in the following table (Table 1):

A graphic display of these codewords is shown in FIG. 4. In accordance with the graphical representation of FIG. 4, the x, y, z coordinates are real($c_i$ (2)), imag($c_i$ (2)) and abs($c_i$ (1)) respectively. It is worth pointing out that the Stiefel manifold of complex 2-D space is not the same as the real 3-D unit sphere surface. Therefore the codewords may not populate the sphere surface uniformly.

The vector along the positive y-axis depicts the first codeword. The next 5 codewords form a "polar cap" near the first codeword. In the tracking mode mentioned above, the beamforming matrix can be quantized by the codewords in the "polar cap", thus reducing the need to search the full codebook. This particular ordering of the codewords reduces the quantization complexity in the tracking mode. Furthermore, the ordering of the codebook also enables a flexible microarchitecture implementation of the quantization process. In this illustrated example, the circuit only needs to search the first 6 codewords to guarantee beamforming convergence when channel changes slowly, while higher performance device can implement full searching complexity for faster convergence.

As introduced above, in a stationary channel condition, the final accuracy of the beamforming only depends on the codewords density near the polar cap. Accordingly, CMA 108 selectively improves the codebook by introducing a denser "polar cap" for tracking purpose, block 306. Just such an example is provided in Table 2, below, where the codebook $C_{NU}(2,12+4)$ is introduced where an extra m codewords (e.g., where m is 4 in this example) near the "north pole" is added:

| 1.0000 + 0.0000i | 0.9962 | 0.9962 | 0.9962 |
| 0 − 0.0000i | 0 + 0.0872i | −0.0872 | 0 − 0.0872i |
| 0.9962 | 0.8507 + 0.0000i | 0.8507 − 0.0000i | 0.8507 − 0.0000i |
| 0.0872 | −0.3599 − 0.3832i | 0.0659 + 0.5216i | 0.5164 + 0.0985i |
| 0.8507 + 0.0000i | 0.8507 + 0.0000i | 0.5257 − 0.0000i | 0.5257 − 0.0000i |
| 0.2532 − 0.4607i | −0.4757 + 0.2239i | 0.5824 + 0.6200i | −0.1067 − 0.8439i |
| 0.5257 + 0.0000i | 0.5257 − 0.0000i | 0.5257 − 0.0000i | 0.0000 + 0.0000i |
| −0.8356 − 0.1593i | −0.4097 + 0.7455i | 0.7697 − 0.3623i | −0.9967 − 0.0818i |

A graphical representation of such a non-uniform codebook is presented with reference to FIG. 5. In accordance with the illustrated example of FIG. 5, the graphical representation of the codebook shows the additional m-codewords (4) codewords (in black) clustered near the first codewords.

Having generated the non-uniform codebook, CMA 108 may selectively quantize the non-uniform codebook for feedback to a remote communications device (e.g., 102), block 308, as the explicit feedback, closed loop MIMO process continues.

Figure 6:
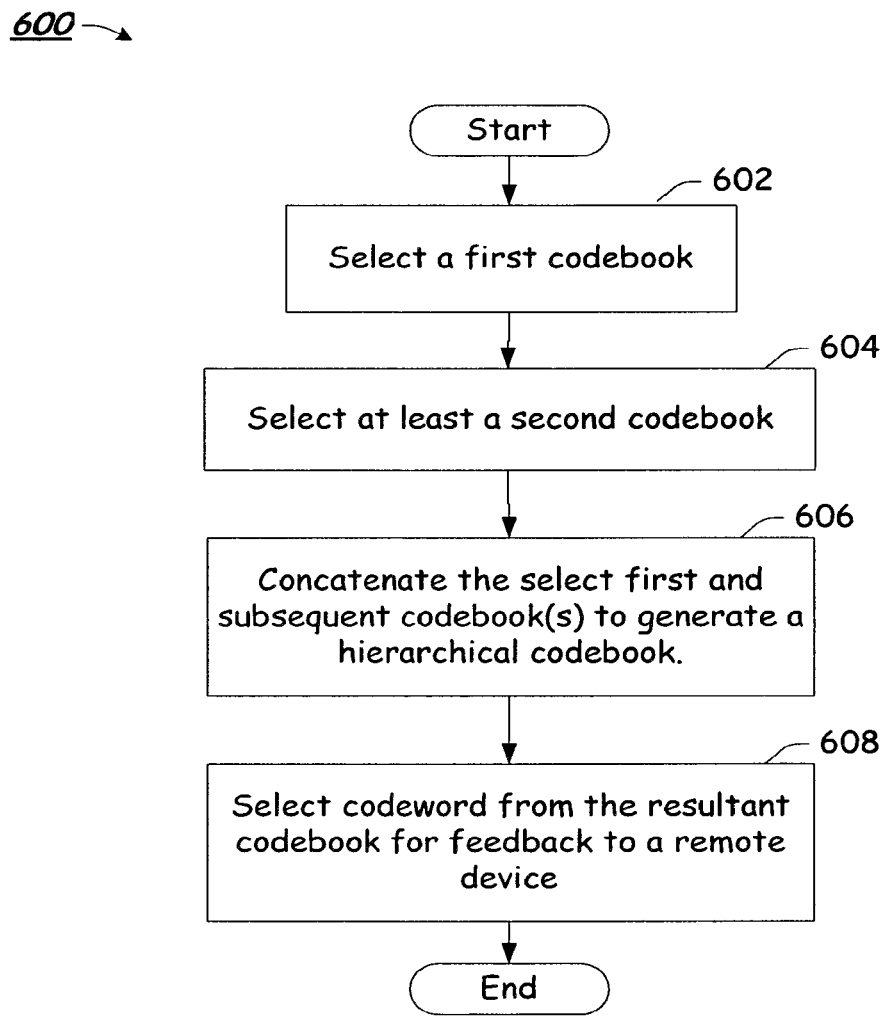
FIG. 6 is a flow chart of an example method of beamforming using a hierarchical codebook, according to one embodiment.

Turning to FIG. 6, a flow chart of an example method for generating a hierarchical codebook is presented, according to one embodiment. In block 602, CMA 108 selects a first codebook. According to one embodiment, the first codebook is selected for coarse quantization. According to one embodiment, the coarse codebook has $N_c$ vectors and the vectors have a dimension M. If the entries of channel matrix are independently and identically distributed, it may be desirable that the vectors are uniformly distributed as much as possible

| 1.0000 + 0.0000i | 0.8507 + 0.0000i | 0.8507 − 0.0000i | 0.8507 − 0.0000i |
| 0 − 0.0000i | −0.3599 − 0.3832i | 0.0659 + 0.5216i | 0.5164 + 0.0985i |
| 0.8507 + 0.0000i | 0.8507 + 0.0000i | 0.5257 − 0.0000i | 0.5257 − 0.0000i |
| 0.2532 − 0.4607i | −0.4757 + 0.2239i | 0.5824 + 0.6200i | −0.1067 − 0.8439i |
| 0.5257 + 0.0000i | 0.5257 − 0.0000i | 0.5257 − 0.0000i | 0.0000 + 0.0000i |
| −0.8356 − 0.1593i | −0.4097 + 0.7455i | 0.7697 − 0.3623i | −0.9967 − 0.0818i | on a M dimensional complex Stiefel manifold (similar to unit sphere). Otherwise, the vectors may not be uniformly distributed.

In block 604, CMA 108 selects a second and/or subsequent codebook(s). According to one embodiment, the second codebook is selected for fine quantization around, e.g., a selected center.

In block 606, CMA 108 may concatenate at least subsets of each of the selected first and second (and/or subsequent) codebooks to form a hierarchy codebook. Although the concatenated codebook doesn't provide the best performance for a given feedback overhead, it enables low complexity quantization and scalable feedback resolution. In addition, since the beamforming matrix approaches to identity matrix after several feedbacks, the station may only use ring codebooks without vector codebooks for the quantization of some vectors in slow fading. This reduces the feedback overhead for tracking the beamforming matrix.

A graphical representation of an example hierarchy codebook is presented with reference to FIG. 7. As shown, for each vector of the coarse codebook, a fine codebook is defined. The vectors of the fine codebook (denoted as $r_j$s) surround select vector(s) of the coarse codebook (denoted as $v_i$). The fine codebook may be dynamically generated according to $v_i$ of the co-pending Lin application to reduce storage complexity. The fine vector $r_j$s may populate a cap, or a ring, or other shape on the manifold. The profile size of the fine codebook can be dynamically adjusted during the tracking in order to reduce quantization error. For example, the initial feedback may employ a large profile size because the quantization error due to coarse codebook is large and the latter tracking feedback may use a small one because the beamforming matrix is close to identity matrix.

An example of a fine codebook is as follows. The fine vectors $r_j$s of the coarse vector $v_i$ are located on a M−1 (complex) dimensional ring (or circle), whose center is the M-(complex) dimensional $v_i$ and the plane holding the ring is perpendicular to the vector $v_i$ as shown in FIG. 7. As used herein, the vector $v_i$ may have M-complex dimensions or 2M real dimensions. The radius of the ring can be dynamically adjusted to reduce quantization error. The fine vectors can be computed as:

$$r_j = F_i \begin{bmatrix} \cos\theta \\ \sin\theta f_i \end{bmatrix}, \quad (11)$$

where $\theta$ is the angle between $r_j$ and $v_i$; $F_i = I - 2w_i w_i^H$ is the Householder reflection matrix of $$v_i w_i = \frac{v_i - e_1}{\|v_i - e_1\|}$$

and $e_1 = [1,0,\ldots,0]_T$; $f_j$ is a unit M-1 dimensional vector for the j-th vector on the ring. Since $F_i$ is unitary and its first column is $v_i$, all the columns except the first form the plane orthogonal to $v_i$, which holds the ring. Since the Householder matrix is easy to compute, this scheme is computationally efficient.

In general, the matrix $F_i$ can be substituted by any other unitary matrix that the first column is $v_i$. For an example, $F_i$ can be replaced by Bi in (10). This may enable an implementation using CORDIC algorithms. The vectors $f_j$s are obtained from search as:

$$\{f_j\}_{j=1}^{N_f} = \underset{(\tilde{f}_j)_{j=1}^{N_j}, \|\tilde{f}_i\|=1}{\arg\max} \left( \underset{k,j=1,\ldots,N_j, k \neq l}{\min} \left\| \cos^2\theta_0 + \sin^2\theta_0 \hat{f}_k^H \hat{f}_l \right\| \right). \quad (11)$$

According to one embodiment, the search increases (e.g., substantially maximizes) the distance between the nearest two vectors that has the general form $$\begin{bmatrix} \cos\theta_0 \\ \sin\theta_0 \hat{f}_j \end{bmatrix}.$$

Since the search result is not sensitive to $\theta_0$, which determines the ring radius, fine codebooks with different radius can be dynamically generated by keeping $f_j$ the same and changing $\theta$ in (10). In the search of (11), $\theta_0$ can be determined from the statistics of the quantization error. For the quantization of 4.times.1 unit, complex vector, $\theta_0$ is about 15 degrees and $\theta$ is about 20 degrees for the initial feedback. The radius $\theta$ can usually be reduced for the subsequent tracking feedbacks. For OFDM system, $\theta$ can remain constant for all subcarriers for one feedback.

According to one embodiment, the fine codebook is formed by the center vector, $v_i$, and the ring vectors, $r_j$, for $j=1,\ldots,N_f$. The total number of fine codebook vectors is $N_f+1$, which can be a power of 2.

For another example, the fine codebook may not only have codeword vectors on the ring. Instead, the fine codeword vectors may spread out the polar cap that has the coarse codebook vector as center and ring as boundary. The fine vectors may be uniformly distributed in the cap or may have a higher density as get closer to the center. The distribution can be obtained by optimizing the quantization accuracy (i.e. reducing quantization error) for a given feedback overhead.

As introduced above, CMA 108 may concatenate the first (coarse) codebook with one or more subsequent (fine) codebook(s), block 606, prior to quantization and feedback to a remote communications device, block 608. It should be appreciated that the concatenation of a coarse codebook with a fine codebook reduces quantization error of the coarse codebook at the cost of additional feedback overhead for the fine codebook. If the resolution of the concatenated codebook is not enough, it can further concatenate another fine codebook, where the vector of the first concatenated codebook is the center of the second concatenated codebook.

In the tracking mode introduced above, the cumulated beamforming matrix is close to identity, the quantization is only needed to be around $[1\ 0,\ldots,0]^T$ for each Householder vector. Therefore, CMA 108 may rotate the whole coarse codebook so that one codeword vector is $[1\ 0,\ldots,0]^T$. This rotation reduces quantization error for tracking mode. However, the rotation is not desirable from peak power viewpoint because it may put all transmission power on one antenna. When the beamforming matrix observed at the receiver, $\hat{V}_3$ in the copending Lin application, approaches identity matrix, the center can be fixed at $[1\ 0,\ldots,0]^T$ and the coarse quantization may be skipped. Only fine quantization and the corresponding feedback need be employed, thereby reducing computational complexity and feedback overhead. This simplification is referred to as localization. Because the statistic of quantization error is different for different Householder vectors and different feedbacks, concatenation, localization, and radius adjustment are employed for each Householder vector for each feedback.

To illustrate, assume for example that a transmitter has 4 antennas and a receiver has 3 antennas. For the initial feedback, the 6, 5, and 4 quantization bits are employed for the coarse quantization of 4-, 3-, and 2-(Householder) vectors respectively, and 3 and 4 bits are employed for the fine quantization for 4- and 3-vectors to enhance resolution respectively, whose radius θ is 20 degrees for both. For the second feedback, the coarse quantization of 4-vector is skipped. The radius is reduced to 15 degrees for 4- and 3-vectors' fine codebooks.

5. Example Communication Device Architecture

Figure 8:
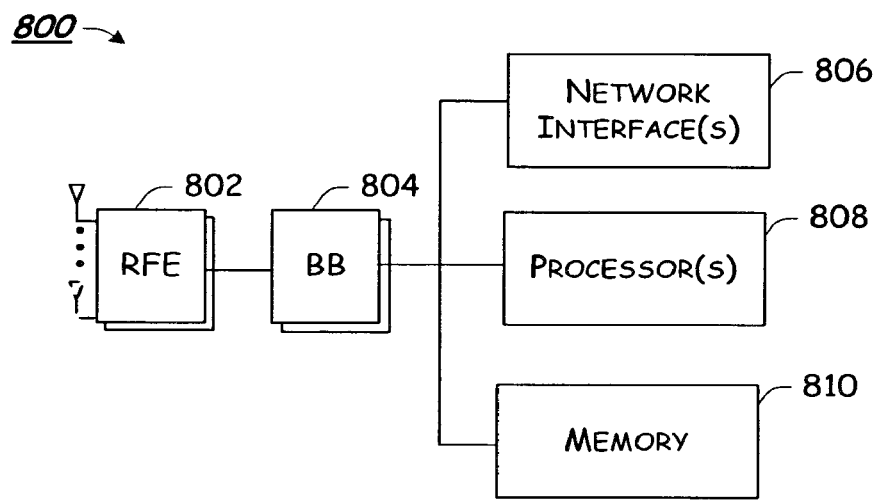
FIG. 8 is a block diagram of an example communications device within which embodiments of the invention may be practiced, according to one embodiment.

Having introduced the communication environment and operating characteristics of CMA 108 with respect to FIGS. 1 through 7, above, reference is now directed to FIG. 8 which provides an example electronic device architecture within which the CMA 108 may be practiced.

FIG. 8 illustrates a block diagram of an example architecture of an electronic device within which the teachings of the present invention may be practiced, according to one embodiment. Electronic device 800 is depicted comprising one or more antennae, an radio frequency (RF) front end (RFE) 802, a baseband processor 804, one or more network interface(s) 406, one or more processor(s) 808 (e.g., application and/or general purpose processors), and memory 810. According to embodiments of the invention, device 800 may well implement one or more aspects of the code management agent (CMA) 108 and/or the data structures themselves introduced above.

In some embodiments, electronic device 800 may represent a system that includes one or more of an access point, a mobile station, a base station, and/or a subscriber unit, and may include other circuits. For example, in some embodiments, electronic device 800 may be a computer, such as a personal computer, a workstation, or the like, that includes an access point or mobile station as an integral and/or peripheral element. Further, electronic device 800 may include a series of devices that are coupled together in a network.

In operation, device 800 may send and receive signals using one or more of the antennas, wherein the signals are processed by the various depicted elements. As used herein, the antennae may be an antenna array or any type of antenna structure that supports MIMO processing. According to one embodiment, such antennae are substantially omnidirectional antennae, but the scope of the invention is not limited in this regard. Device 800 may operate in partial or complete compliance with a wireless network standard such as, e.g., the 802.11 or 802.16 standards introduced above.

According to one embodiment, the RF front end 802 may be selectively coupled to one or more of the antennae to interact with a wireless network. RF front end 802 may include circuitry to support the transmission and reception of radio frequency (RF) signals. For example, in some embodiments, RF front end 802 may include an RF receiver to receive signals and perform one or more processing tasks such as low noise amplification (LNA), filtering, frequency conversion or the like. Further, in some embodiments, RFE 802 may include transform mechanisms and beamforming circuitry to support MIMO signal processing. Also for example, in some embodiments, RFE 802 may include circuits to support frequency up-conversion, and an RF transmitter.

Baseband processor(s) 804 may be a processor with hardware, software and/or firmware (or, combinations thereof) to perform baseband processing. Baseband processor may well be combined with, or implemented by processor 808.

Processor 808 may read instructions and data from memory 810 and perform actions in response thereto. For example, processor 808 may access instructions from memory 810 and perform method embodiments of the present invention, such as, e.g., method 300 (FIG. 2), method 600 (FIG. 6) and/or other methods described herein. In this regard, processor 808 is intended to represent any type of processor, including but not limited to, a microprocessor, a digital signal processor, a microcontroller, or the like.

Memory 810 represents an article that includes a machine readable medium. For example, memory 810 represents a random access memory (RAM), dynamic random access memory (DRAM), static random access memory (SRAM), read only memory (ROM), flash memory, or any other type of article that includes a medium readable by processor 808. Memory 810 may store instructions for to dynamically generate and/or utilize the non-uniform and/or hierarchical codebooks introduced above. Alternatively, such instructions may well be integrated within and/or provided to baseband processor 804.

Network interface 806 may provide communications between electronic device 800 and other systems. For example, in some embodiments, electronic device 800 may be an access point that utilizes network interface 806 to communicate with a wired network or to communicate with other access points. In some embodiments, electronic device 800 may be a network interface card (NIC) that communicates with a computer or network using a bus or other type of port.

As used herein, embodiments of CMA 108 may well be implemented in one or more of RFE 802, baseband processor 804, processor(s) 808, and/or combinations thereof. As introduced above, CMA 108 may well be implemented in hardware, software, firmware or combinations thereof.

Although the various elements of device 800 are depicted as disparate elements in FIG. 8, embodiments are envisioned that may combine one or more elements, or that may contain more elements. For example, the circuitry of processor 808, memory 810, network interface 806, and baseband processor 804 may well be integrated into a single integrated circuit. Alternatively, memory 810 may be an internal memory within baseband processor 804 or processor 808, or may be a microprogram control store within processor 810. In some embodiments, the various elements of device 400 may be separately packaged and mounted on a common circuit board. In other embodiments, the various elements are separate integrated circuit dice packaged together, such as in a multi-chip module, and in still further embodiments, various elements are on the same integrated circuit die.

6. Alternate Embodiment(s)

Figure 9:
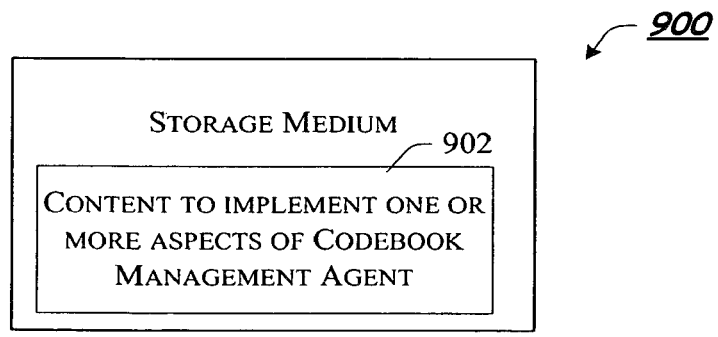
FIG. 9 is a block diagram of an example article of manufacture including content which, when executed by an accessing machine, causes the machine to implement one or more aspects of embodiment(s) of the invention.

FIG. 9 illustrates a block diagram of an example storage medium comprising content which, when invoked, may cause an accessing machine to implement one or more aspects of the codebook management agent 108 and/or associated methods 300 and/or 600, and/or associated data structures (e.g., codebooks). In this regard, storage medium 900 may include content 902 (e.g., instructions, data, or any combination thereof) which, when executed, causes an accessing appliance to implement one or more aspects of the codebook management agent 108 described above.

The machine-readable (storage) medium 900 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect. Such devices may well be employed within any of a variety of embodiments disclosed herein.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   transmitting a wireless signal to a remote device, the remote device to determine a precoding matrix indicator (PMI) in response to the wireless signal based at least in part on a hierarchical codebook; and
   receiving the PMI reported back from the remote device.

2. A method as claimed in claim 1, wherein the hierarchical codebook comprises a first codebook concatenated with a second codebook.

3. A method as claimed in claim 1, wherein the hierarchical codebook includes first index corresponding to a course quantization and a second index corresponding to a fine quantization.

4. A method as claimed in claim 3, wherein the PMI comprises the first index and the second index of the hierarchical codebook.

5. A method as claimed in claim 2, wherein a value of the first codebook allows for a subset of the second codebook to be searched without requiring the entire hierarchical codebook to be searched.

6. An access point, comprising:
   a transmitter to transmit a wireless signal to a remote device, the remote device to determine a precoding matrix indicator (PMI) in response to the wireless signal based at least in part on a hierarchical codebook; and
   a receiver to receive the PMI reported back from the remote device.

7. An access point as claimed in claim 6, wherein the hierarchical codebook comprises a first codebook concatenated with a second codebook.

8. An access point as claimed in claim 6, wherein the hierarchical codebook includes first index corresponding to a course quantization and a second index corresponding to a fine quantization.

9. An access point as claimed in claim 8, wherein the PMI comprises the first index and the second index of the hierarchical codebook.

10. An access point as claimed in claim 7, wherein a value of the first codebook allows for a subset of the second codebook to be searched without requiring the entire hierarchical codebook to be searched.

11. A base station, comprising:
    a transmitter and an array of one or more antennas to transmit a wireless signal to a remote device, the remote device to determine a precoding matrix indicator (PMI) in response to the wireless signal based at least in part on a hierarchical codebook; and
    a receiver to receive the PMI reported back from the remote device.

12. A base station as claimed in claim 11, wherein the hierarchical codebook comprises a first codebook concatenated with a second codebook.

13. A base station as claimed in claim 11, wherein the hierarchical codebook includes first index corresponding to a course quantization and a second index corresponding to a fine quantization.

14. A base station as claimed in claim 13, wherein the PMI comprises the first index and the second index of the hierarchical codebook.

15. A base station as claimed in claim 12, wherein a value of the first codebook allows for a subset of the second codebook to be searched without requiring the entire hierarchical codebook to be searched.

16. An article of manufacture comprising a non-transitory machine readable medium having instructions stored thereon that, if executed, result in:

transmitting a wireless signal to a remote device, the remote device to determine a precoding matrix indicator (PMI) in response to the wireless signal based at least in part on a hierarchical codebook; and receiving the PMI reported back from the remote device.

17. An article of manufacture as claimed in claim 16, wherein the hierarchical codebook comprises a first codebook concatenated with a second codebook.

18. An article of manufacture as claimed in claim 16, wherein the hierarchical codebook includes first index corresponding to a course quantization and a second index corresponding to a fine quantization.

19. An article of manufacture as claimed in claim 18, wherein the PMI comprises the first index and the second index of the hierarchical codebook.

20. An article of manufacture as claimed in claim 17, wherein a value of the first codebook allows for a subset of the second codebook to be searched without requiring the entire hierarchical codebook to be searched.

* * * * *